Patented Apr. 23, 1940

2,198,216

UNITED STATES PATENT OFFICE 2,198,216

BUTTER MANUFACTURE

Sidney Musher, New York, N. Y., assignor to Musher Foundation Incorporated, New York, N. Y., a corporation of New York No Drawing. Application October 28, 1938, Serial No. 237,466

4 Claims. (Cl. 99—163)

This invention relates to improved methods for manufacturing butter and particularly relates to producing improved butter by enhancing the quality of the cream used as a base material therefor.

Cream and butter made therefrom are substantially high in fat and low in milk solids other than fat. Cream, for example, contains 30% fat and 6% milk-solids-not-fat, primarily protein such as casein, milk sugar or lactose and some phospholipin materials.

It has been found that the off tastes and odors such as fishiness developed in butter and also in cream are due primarily to the milk-solids-not-fat portion set forth above and particularly the phospholipin portion. These materials in the usual amounts in which they occur in cream and butter appear to increase the tendency toward deterioration.

An object of this invention is to stabilize cream and more particularly products made therefrom in an inexpensive and readily acceptable manner and to improve the keeping quality of cream and butter and to retard development of tallowy, metallic, oxidized, fishy, etc., odors and flavors.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, I have found that the addition of relatively small proportions of concentrated or preferably dried milk-solids-not-fat or serum solids to cream followed by heat treatment will materially stabilize the cream and similarly stabilize products made from it, such as butter. This is true although the normal quantities of serum solids apparently act to accelerate deterioration of the cream and butter produced therefrom.

This heat treatment should preferably be substantially above 145° F. and desirably may be carried out at 155° F. to 180° F. or above for from 10 seconds to 15 minutes. Desirably these serum solids are added in an amount varying from 1.0% to 15.0% against the butterfat weight of the cream.

Example I

To cream containing 30% butterfat was added 3 parts per million of $CuSO_4$ and the cream divided into two lots as follows:

Cream A. Heated to 170° F. for 5 minutes.

Cream B. Treated with 2.0% of powdered skim milk and then heated at 170° F. for 5 minutes.

The creams were set aside at 45° F. and tested for tallowiness and deterioration at regular intervals with the following results (the number of + signs indicating degree of deterioration):

|  | After— | | |
|---|---|---|---|
|  | 24 hours | 48 hours | 72 hours |
| Cream A | + | ++ | ++++ (inedible) |
| Cream B | − | ± | + |

Heat treatments of 145° F. are insufficient to show the most desirable stabilizing action that is particularly observed at 155° F. and preferably at 170° F. or above. Temperatures as high as 250° F. or higher even though for only minute fractions of a minute are satisfactory and are generally superior to longer holding periods at lower temperatures.

In place of heating, or preferably in addition to the heat treatment, homogenization may also be resorted to in order to produce the stabilizing action. The more intimate contact of the fat globules with the increased serum solids at the temperature of activation results in marked stabilization.

Example II

30% cream containing 3 p. p. m. of $CuSO_4$ was prepared as follows:

Cream A: Treated with 3.0% of powdered skim milk and then heated at 180° F. for 1 minute;

Cream B. Heated at 180° F. for 1 minute and then treated with 3.0% of powdered skim milk.

The creams were tested as before:

|  | After— | | |
|---|---|---|---|
|  | 24 hours | 48 hours | 72 hours |
| Cream A | − | − | ± |
| Cream B | ± | ++ | +++ |

It may be observed that where the heat treatment was given after addition of the serum solids a desirable improvement was observed, but where the heat treatment was given before the addition, deterioration took place rapidly.

Example III

35% cream was contaminated with 3 p. p. m. of $CuSO_4$, treated with 1.0% of powdered buttermilk and heated as follows:

Cream A. Heated at 145° F. for 30 minutes.

Cream B. Heated at 170° F. for 5 minutes.

Cream C. Heated at 200° F. for 30 seconds.

The creams were examined with the following results:

|  | After— | | |
| --- | --- | --- | --- |
|  | 24 hours | 48 hours | 72 hours |
| Cream A | ± | + | ++ |
| Cream B | − | ± | ± |
| Cream C | − | − | − |

The exact mechanism by which this invention is operative is not well understood. Although the added serum solids are water soluble and remain substantially in the water phase, nevertheless the fat of the cream is protected against deterioration.

Moreover, although in the churning of the cream in making butter, those serum solids are washed into the buttermilk, nevertheless, the butter churned out of the cream and substantially free of serum solids is stabilized against deterioration. The churning operation involves the coalescing of the butter fat globules at the same time that the fat is substantially freed of contact with the serum solids of the cream.

*Example IV*

32% cream was prepared:
A. With 3.0% of powdered skim milk, heated at 170° F. for 6 minutes and then churned into butter;
B. Heated at 170° F. for 6 minutes (with no added powdered skim milk) and then churned into butter.

The butters were stored at 50° F. and scored at 3 week intervals.

|  | Butter score after— | | |
| --- | --- | --- | --- |
|  | 3 weeks | 6 weeks | 9 weeks |
| Butter made from cream A | 91.0 | 90.5 | 89.75 |
| Butter made from cream B | 90.5 | 89.5 | 89.0 |

Not only is the cream itself stabilized, so that it may be frozen for subsequent manufacture into ice cream, but whipping cream, butter, cream cheese, powdered cream and other products derived from cream or made with the stabilized cream will be substantially stabilized.

*Example V*

30% cream containing 3 p. p. m. of $CuSO_4$ was prepared as follows:
Cream A. Treated with 5.0% powdered skim milk and heated at 185° F. for 2 minutes;
Cream B. Heated at 185° F. for 2 minutes and then treated with 5.0% powdered skim milk.

The cream was stored at 10° F. for 90 days and then used in the manufacture of strawberry ice cream. The degree of oxidized flavors observed with ice cream is given in the following table:

|  | Ice cream after— | | |
| --- | --- | --- | --- |
|  | 0 days | 10 days | 20 days |
| Using cream A | − | ± | − |
| Using cream B | + | ++ | ++++ (inedible) |

Among the serum solids that may be used in accordance with the invention are those comprising powdered skim milk, powdered buttermilk, powdered whey, and similar products. There may also be included the lower fat containing materials such as partially skimmed powdered whole milk, etc. Although the substantially dried or dehydrated serum products are desirable for use, there may also be included the concentrated or evaporated milk products including concentrated or plastic buttermilk, condensed whey, separator residue, etc.

Extracts of these materials may also be included such as particularly the alcohol soluble or water soluble extract or other extract using OH solvent of a low molecular weight aliphatic group, or lactose (milk sugar), casein (milk protein), milk phospholipin, etc. When the extracts are used, proportions as low as 0.1% or lower may be employed.

*Example VI*

The cream used in Example V was:
A. Treated with 0.2% of the ethyl alcohol extract of powdered skim milk, and then heated at 180° F. for 5 minutes;
B. Heated at 180° F. for 5 minutes (without the addition of the extract).

|  | After— | | |
| --- | --- | --- | --- |
|  | 24 hours | 48 hours | 72 hours |
| Cream A | − | + | + |
| Cream B | + | ++ | +++ |

There may also be employed mixtures of lactose (milk sugar) and casein (milk protein), lactose and phosphatides such as lecithin, etc. These materials similarly require activation under conditions of heat.

*Example VII*

The cream used in Example V was:
A. Treated with 2.0% of a mixture of equal parts of lactose and casein and heated to 190° F. for 15 seconds; and cooled
B. Heated to 190° F. for 15 seconds, cooled, and then treated with 2.0% of the mixture of lactose and casein.

|  | After— | | |
| --- | --- | --- | --- |
|  | 24 hours | 48 hours | 72 hours |
| Cream A | ± | + | + |
| Cream B | + | ++ | ++++ |

It is also possible to utilize for addition to cream before heating combinations of protein such as casein and phosphatides such as lecithin, or combinations of sugars such as lactose and phosphatides such as lecithin, or combinations of sugars and polycarboxylic aliphatic acids having between 3 and 12 carbon atoms, or groups of these combinations. These various materials may be utilized in varying proportions such as from 1 part of one to 10 parts of another, etc. The phosphatides particularly may be utilized in smaller proportions such as in amounts as little as 0.5% in the various mixtures.

It has also been found that certain other mixtures function similarly such as sugars and any one of the following materials; citric acid, tartaric acid, gluconic acid, saccharic acid, phosphoric acid, etc., the stabilizing action taking place under conditions of heat.

It is also possible if desired to add to the dry or concentrated serum solids amounts varying, for example, from 1% to 10% or more of the cereal flours, such as oat flour, barley flour, maize flour, etc., the de-oiled seeds, such as de-oiled peanut meal, etc., but preferably these materials are not used. It is also possible and more preferable to use the water or alcohol soluble extracts of these materials in combination with the serum solids.

The water soluble extract of the cereals, such as of oat flour, for example, when used with skim milk as a stabilizer and activated under conditions of heat, is far more effective than either the extract or the skim milk alone.

*Example VIII*

30% cream was treated with 0.1% of a material made by removing the water extract of pulverized oats, adding to it equal quantities of skim milk, on the solids weight basis, and evaporating the water therefrom, the cream being treated as follows:

Cream A. Heated to 160° F. for 10 minutes and then treated with 0.1% of the material;

Cream B. Treated with 0.1% of the material and then heated to 160° F. for 10 minutes.

The creams were examined with the following results:

|  | After— | | |
|---|---|---|---|
|  | 24 hours | 48 hours | 72 hours |
| Cream A | + | ++ | +++ |
| Cream B | − | ± | + |

In place of the use of powdered skim milk there may also be employed other more effective stabilizing materials made up of combinatons of powdered skim milk with other products. For example, there may be utilized a mixture comprised of 90% powdered skim milk, 5% lecithin and 5% dextrose, or a mixture comprising 85% powdered skim milk and 15% lecithin, or a mixture comprising 98% powdered buttermilk and 2% tartaric acid.

Where lecithin is used with powdered skim milk, the addition of the lecithin can be made to the skim milk while in liquid condition and that mixture subjected to homogenization in order to thoroughly mix in the lecithin with the milk and then powdering the mixture. This homogenized lecithin mixture may be used for addition to cream in the manufacture of butter, for example.

Where the cream is to be used in the manufacture of an ice cream mix, it is desirable for the cream to be heated to a temperature of at least 165° F. or higher prior to the addition of added sugar in order to avoid excess carbonization or caramelization of the sugar to be added later. For example, in an ice cream mix where 10% of sugar is normally added, the powdered skim milk may be added to the cream and that mixture heated to a temperature of, for example, 165° F. or higher, allowed to cool, and then the remainder of the sugar and flavoring constituents added following such heat treatment.

Having described my invention, what I claim is:

1. A method for manufacturing substantially stabilized butter, highly resistant to oxidative deterioration, which comprises adding to a cream containing about 30% to 35% of butterfat about 3% of powdered skim milk, dispersing said skim milk in said cream, heating said cream to about 170° F. for about 6 minutes, churning the cream into butter to produce a butter containing coalesced butterfat globules, said butter being substantially free of the added powdered skim milk and said butter produced from cream initially containing its normal proportion of milk serum solids in respect to its butterfat content.

2. A method for manufacturing substantially stabilized butter, highly resistant to oxidative deterioration, which comprises adding to a cream containing about 30% to 35% of butterfat about 1% to 15% of added substantially concentrated milk serum solids against the butterfat weight of the cream, heating the cream to at least 170° F. and then churning to remove substantially all the added concentrated serum solids, said butter containing coalesced butterfat globules.

3. A method for manufacturing substantially stabilized butter, highly resistant to oxidative deterioration, which comprises adding to a cream containing about 30% to 35% total butterfat from 1% to 15% of added milk serum solids, heating the cream containing the added milk serum solids to substantially above 145° F. and then churning to remove substantially all of the milk serum solids whereby there is produced a butter containing coalesced butterfat globules.

4. A process of producing substantially stabilized butter, highly resistant to oxidative deterioration, which comprises heating cream containing its normal proportion of milk serum solids to substantially above 145° F. with a relatively small proportion of added milk serum solids and then churning to produce butter substantially free of said added milk serum solids, said butter containing coalesced butterfat globules produced during churning.

SIDNEY MUSHER.